United States Patent [19]
Bolton et al.

[11] Patent Number: 5,124,208
[45] Date of Patent: Jun. 23, 1992

[54] FIRE RESISTANT WINDOWS

[75] Inventors: Nelson Bolton, Trumbauersville; W. Novis Smith, Philadelphia, both of Pa.

[73] Assignee: Artistic Glass Products, Trumbauersville, Pa.

[21] Appl. No.: 745,607

[22] Filed: Aug. 14, 1991

Related U.S. Application Data

[62] Division of Ser. No. 546,232, Jun. 28, 1990, Pat. No. 5,061,748.

[51] Int. Cl.$^5$ .................... B32B 17/10; B32B 27/08; B32B 27/20; B32B 33/00
[52] U.S. Cl. ......................... 428/412; 109/49.5; 109/58.5; 109/78; 156/99; 428/38; 428/424.2; 428/425.6; 428/429; 428/437; 428/441; 428/451; 428/483; 428/500; 428/515; 428/911; 428/920

[58] Field of Search ................ 428/412, 424.2, 425.6, 428/429, 437, 441, 451, 483, 500, 515, 911, 920

[56] References Cited

U.S. PATENT DOCUMENTS 5,061,748 10/1991 Bolton et al. .

FOREIGN PATENT DOCUMENTS 0006780 1/1985 Japan .

Primary Examiner—James C. Cannon
Attorney, Agent, or Firm—John Lezdey

[57] ABSTRACT

An optically transparent aqueous intumescent gel for use with transparent laminates comprising about 5 to 30% by weight acrylamide, about 0 to 4% by weight of a crosslinking agent, about 5 to 28% by weight of an ammonium or alkali metal salt of an alkanoic acid having 1 to 4 carbon atoms, about 0.05 to 10% by weight of a polymerization catalyst, and water, and a laminate with the gel.

13 Claims, 1 Drawing Sheet

FIRE RESISTANT WINDOWS

This is a divisional application of Ser. No. 546,232, filed Jun. 28, 1990, is U.S. Pat. No. 5,061,148.

BRIEF DESCRIPTION OF THE INVENTION

FIG. 1 is a fragmentary sectional view of a laminate of the invention.

DESCRIPTION OF THE PREFERRED EMBODIMENTS

Figure 1:
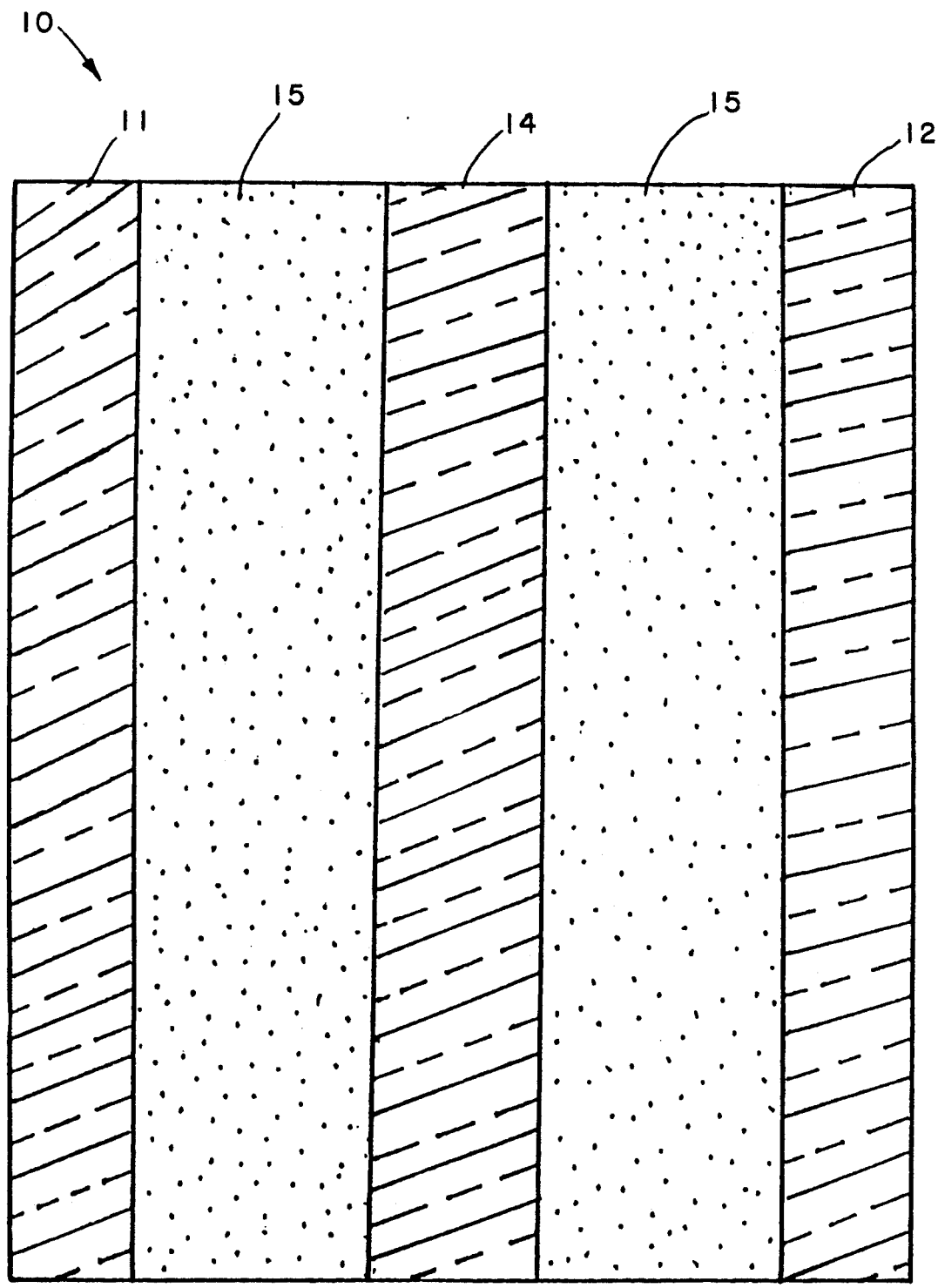

Although specific terms are used in the following description for the sake of clarity, these terms are intended to refer only to the particular structure of the invention selected for illustration in the drawing, and are not intended to define or limit the scope of the invention.

It is understood that the following description omits many structural elements commonly found in laminating glazing units for aircraft, such as mounting frames, such as those in U.S. Pat. No. 3,410,739 to Orcutt, temperature sensing devices, such as those shown in U.S. Pat. No. 3,789,191 to Spindler, reinforcing frames such as those shown in the aforesaid Orcutt and Shorr patents and other structural elements well known in the art.

FIG. 1 shows an example of a laminate 10 of the invention. The laminate is formed with parallel transparent outer sheets 11, 12 and an inner resinous layer 14. Intumescent gel layers 15,15' are provided between the outer layers and the inner layer.

The intumescent gel of the invention is generally prepared by adding about 5 to 30% by weight of acrylamide to an aqueous solution of an alkanoic acid salt and then crosslinking the acrylamide with a crosslinking agent such as N,N'-methylene bisacrylamide. A crosslinking agent although preferred is not essential in the composition. The mixture is stirred and a polymerization catalyst such as ammonium persulfate may be added to speed up the gelling reaction.

Freezing point depressants for the gel such as ethylene glycol, sodium bicarbonate, sodium silicate, sodium chloride, and the like can be added.

The preferred freezing point depressants are the ammonium and/or alkali metal salts of the alkanoic acid such as sodium formate, lithium formate, ammonium formate, sodium acetate, and the like.

The laminate 10 can be held within a frame in a conventional manner, for example, as disclosed in any one of U.S. Pat. Nos. 4,321,777; 4,368,226; 2,244,489 or the like. The frame can be provided with means for securing to a supporting structure in a manner dependent upon use and location of the structure. To further secure the laminate in the frame, the frame may be filled with high impact strength resin. Suitable resins include epoxy resins, thermosetting phenolic resins, polymers of caprolactam, and the like. U.S. Pat. No. 4,593,070 to Oyama et al and U.S. Pat. No. 4,593,073 to St. Pierre et al, which are herein incorporated by reference disclose suitable resins.

The thickness of the outer layers 11,12 is usually about 20 mils. The inner resinous layer 14 is usually greater than 30 mils in thickness, preferably about 50 to 60 mils. However, for maximum security the outer layers as well as the inner layers may have a thickness greater than 50 mils. The various thickness depends on location and use of the laminate.

It is also understood while the present invention illustrates an innerlayer of extruded transparent plastic material, the term "innerlayer," as it is contemplated for use of the present invention, may comprise one or more layers of extruded transparent plastic material bonded to one another or made integral to one another with intermediate layers of transparent material of either rigid or flexible nature therebetween. The term "innerlayer" as herein contemplated also includes structures comprising rigid plies of coated or uncoated inonomer or polycarbonate or acrylic or polyester and/or flexible plies of polyurethane, and other esters commonly used as innerlayer materials or combinations of rigid and flexible materials within outer plies of extruded transparent plastic material so that the "innerlayer" has outer surfaces of extruded transparent plastic material facing a glass surface or a coated glass surface.

The innerlayer may comprise one or more layers of polyurethane, polyvinyl butyral resin, polyethylene terephthalate, commercially available as Du Pont's MYLAR, polyesters, ionically cross-linked ethylenemethacrylic acid copolymer or ethylene-acrylic acid copolymer which may be neutralized with a polyamine, and the like.

The polyurethanes preferably used according to the principles of the present invention can broadly be described as the reaction product of a polyisocyanate and polyol which upon lamination forms a transparent layer. The polyurethanes may have thermosetting or thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49, 3181 (1927). Suitable polyisocyanates are organic diisocyanates which include aromatic, aliphatic, cycloaliphatic and heterocyclic diisocyanates. Examples are 2,4-toluene diisocyanate, 1,4-butane diisocyanate, 1,2-diisocyanato-methyl cyclobutane, 4,4-methylene-bis (cyclohexyl) diisocyanate 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC-R-COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly 1,4-butylene adipate having a molecular weight of about 1800 to 2200. The polyurethanes preferably are used in sheets of about 10 mils to 45 mils in thickness.

The ionomer resin which can be used in the invention is obtained by combining a copolymer of ethylenemethacrylic acid or ethylene-acrylic acid and a polyamine.

In addition, the copolymer can already be partially neutralized with up to 90% of a metal cation such as sodium or other alkali metal, ammonium salt, zinc and an aluminum salt. A particular example of such a copolymer is SURLYN 1601, manufactured by the Polymer Products Department of the DuPont Company.

The outer sheets which may be used in the invention may be any well known commercial plate, float or sheet glass composition, tempered glass is most preferable, polycarbonate resin, fused acrylic/polycarbonate resins, acrylic resins, polyurethanes, ionomer resins, diallyl glycol carbonate resins and the like. The polycarbonate is generally used in sheets of about 5 to 250 mils in thickness. The sheets may be coated with an abrasion resistant coating.

The intumescent gels used in the invention should be optically transparent and substantially non-degradable upon standing for long periods of time. Intumescent materials which are not gels such as the clear polyurethane coatings disclosed in U.S. Pat. No. 3,497,469 do not provide good optical clarity. In addition, there is a tendency to delaminate. The layers of gel are generally about 0.25 to 0.50 inches in thickness. It has been found that the gel not only provides the resistance to heat and fire but additionally provide a cushion which prevents chipping and stress cracking when installing in a supporting frame and as a thermal expansion cushion for the adjacent layers.

Primers may also be used to promote adhesion between the ionomer resin, the glass and polycarbonate respectively. Primers suitable for glass, and the glass/ionomer resin interface in particular, may include silanes, such as those produced under the registered trademarks "Z-6040" and "Z-6020" by Dow Chemical Company. Other primers suitable for the polycarbonate/ionomer resin interface in particular, include organic amines, usually in a diluted solution with an inert solvents (unlikely to attack the polycarbonate, e.g., alkanes and alcohols), such as aliphatic or polyethylene amines or ethanolamines, and specifically diethylenetriamine. Other specific primers include diisocyanates (toluene diisocyanatate) and polyacrylic acid (produced under the registered trademark ACRYSOL by the Rohm and Haas Company).

In some cases, primers may also be used to promote adhesion of the intumescent gels to their adjacent surfaces.

When the outside surface is a polymeric sheet it is sometimes advisable to provide the exposed surface with a hard coat to prevent scratch, abrasion or other damage. Useful hard coats which have optical clarity are organosilicon products such as described in U.S. Pat. No. 4,027,073. These products can also serve as barrier coatings on the inner layer.

Specific embodiments of the above basic panel may assume various shapes and the arrangement of the panel components may vary depending upon particular design requirements. Additional components such as temperature control sensing devices may be incorporated into the basic panel structure.

The sheets of glass used in the panel may be of the same or different sizes. The peripheral margins of the innerlayer materials may be cut flush with the edges of the adjacent glass sheets and/or may extend beyond the edges of some of the glass sheets to provide in itself a resilient means for supporting the laminated glass assembly. The innerlayer may be provided with inserts which have characteristics that inhibit delamination and a phenomenon known as "cold chipping." Where an innerlayer has extended portions, these portions may include innerlayer inserts for reinforcement of the interlayer material. Electrical terminal blocks may be mounted on any desired surface of the panel which is accessible for power lead attachment purposes when the panel has been mounted on the support body.

The laminated articles of this invention have utility in a variety of different environments including security installations, armored vehicles, banks, factories, airplanes, space vehicles, submarines, and the like.

The following examples are illustrative of the gels of the invention. It will be understood, however, that it is not to be construed in any way limitative of the full scope of the invention since various changes can be made without departing from the spirit of the teachings contained herein, in the light of the guiding principles which have been set forth above.

All percentages herein stated are based on weight except wherein noted.

EXAMPLE I

A gel of the invention is prepared as follows:

| Ingredients | % by Weight |
| --- | --- |
| Acrylamide | 12.5 |
| Sodium formate | 15.0 |
| N,N'-Methylene bisacrylamide | 0.3 |
| Catalyst | 0.3 |
| N,N,N',N-Tetramethylethylene diamine (Tmeda) | 0.1 |
| Water | q.s. |

All the ingredients except the catalyst are placed into a 15% solution of sodium formate and stirred until clear. The catalyst is then added and the mixture is poured into a mold.

EXAMPLE II

Following the procedure of Example I, a gel is prepared from the following composition:

| Ingredients | % by Weight |
| --- | --- |
| Sodium formate | 10.0 |
| Acrylamide | 12.0 |
| Luddox | 12.0 |
| N,N'-Methylene bisacrylamide | 0.1 |
| Tmeda | 0.05 |
| Ammonium persulphate | 3.0 |
| Ethylene glycol | 4.0 |
| Water | q.s. |

EXAMPLE III

Following the procedure of Example I, a gel is prepared from the following composition:

| Ingredients | % by Weight |
| --- | --- |
| Acrylamide | 14.0 |
| Sodium formate | 20.0 |
| N,N'-Methylene bisacrylamide | 0.75 |
| Ammonium persulphate | 6.0 |
| Tetramethyl orthosilicate | 1.0 |
| Water | q.s. |

If desired other temperature depressants such as sodium bicarbonate, sodium chloride or ethylene glycol may be added.

The form of the invention shown and described herein represents an illustrative preferred embodiment and variations thereof. It is understood that various changes may be made without departing from the gist of the invention as defined in the claims.

What is claimed is:

1. A fire resistant and impact resistant transparent laminate comprising at least two spaced parallel sheets of transparent material selected from the group consisting of group and polymeric material, at least one optically transparent resinous inner layer between said parallel sheets, and a layer of the optically transparent gel on at least one side of said inner layer, said gel comprising about 5 to 30% by weight acrylamide, about 0 to 4% by weight of a crosslinking agent, about 5 to 28% by weight of an ammonium or alkali metal salt of an alkanoic acid having 1 to 4 carbon atoms, about 0.05 to 10% by weight of a polymerization catalyst, and water.

2. The laminated claim 1, wherein said resinous layer is an ionomer.

3. The laminate of claim 1, wherein said spaced sheets comprises glass.

4. The laminate of claim 1, comprising two spaced glass layers, a siloxane coated ionomer layer between said spaced glass layers and said gel being adhered to said coated ionomer.

5. The laminate of claim 1 wherein said crosslinking agent in said gel is about 5 to 30% by weight acrylamide, about 0 to 4% by weight of a crosslinking agent, about 5 to 28% by weight of an ammonium or alkali metal salt of an alkanoic acid having 1 to 4 carbon atoms, about 0.05 to 10% by weight of a polymerization catalyst, N,N'-methylene bisacrylamide and water.

6. The laminate of claim 1 wherein said alkali metal salt of an alkanoic acid in said gel is sodium formate.

7. The laminate of claim 1 wherein said alkali metal salt of an alkanoic acid in said gel is sodium acetate.

8. The laminate of claim 1 wherein said catalyst in said gel is ammonium persulphate.

9. The laminate of claim 1 including N,N,N',N-tetramethylethylenediamine in said gel.

10. The laminate of claim 1 including a melting point depressant in said gel selected from the group consisting of sodium bicarbonate, sodium silicate, sodium chloride and ethylene glycol.

11. The laminate of claim 1 wherein said outer sheets are glass.

12. The laminate of claim 1 wherein at least one outer sheet is polycarbonate.

13. The laminate of claim 1 wherein the surfaces adjacent said gel are primed to obtain better adhesion of said gel.

* * * * *